United States Patent
Le et al.

(10) Patent No.: US 11,792,521 B1
(45) Date of Patent: Oct. 17, 2023

(54) IMAGING APPARATUS

(71) Applicant: Tu Le, Playa Vista, CA (US)

(72) Inventors: Tu Le, Playa Vista, CA (US); Michael Thaler, Augusta, WI (US)

(*) Notice: Subject to any disclaimer, the term of this patent is extended or adjusted under 35 U.S.C. 154(b) by 0 days.

(21) Appl. No.: 17/661,038

(22) Filed: Apr. 27, 2022

(51) Int. Cl.
| | |
|---|---|
| *H04N 23/698* | (2023.01) |
| *H04N 23/54* | (2023.01) |
| *H04N 23/56* | (2023.01) |
| *H04N 23/66* | (2023.01) |
| *H04N 23/695* | (2023.01) |

(52) U.S. Cl.
CPC ........... *H04N 23/698* (2023.01); *H04N 23/54* (2023.01); *H04N 23/56* (2023.01); *H04N 23/66* (2023.01); *H04N 23/695* (2023.01)

(58) Field of Classification Search
CPC .... H04N 23/698; H04N 23/66; H04N 23/695; H04N 23/54; H04N 23/56
See application file for complete search history.

(56) References Cited

U.S. PATENT DOCUMENTS

| | | | |
|---|---|---|---|
| 5,531,412 A * | 7/1996 | Ho | F16M 11/2092 396/428 |
| 5,697,757 A * | 12/1997 | Lindsay | F16M 11/18 212/197 |
| 9,429,817 B1 | 8/2016 | Harder et al. | |
| 9,742,991 B2 | 8/2017 | Latorre | |
| 10,824,055 B1 | 11/2020 | McGuire et al. | |
| 2011/0293262 A1 | 12/2011 | Lai | |

FOREIGN PATENT DOCUMENTS

| | | |
|---|---|---|
| CN | 109519660 | 3/2019 |
| CN | 110131538 | 8/2019 |
| EP | 3163146 | 10/2020 |
| JP | 6081856 | 5/1985 |

OTHER PUBLICATIONS

360 Photo Booth, https://magicmomentphotobooth.com/360-photo-booth/, last visited Apr. 25, 2022.
360-XL LED Photo Booth Enclosure, https://spinpix360.com/collections/360-photo-booth-enclosures/products/xI-led-enclosure, last visited Apr. 25, 2022.
Pixter360, https://www.pixsterphotobooth.com/pixster-360-photo-booth, last visited Apr. 25, 2022.

\* cited by examiner

*Primary Examiner* — Kathleen V Nguyen
(74) *Attorney, Agent, or Firm* — Schneer IP Law

(57) ABSTRACT

The present invention relates to an imaging apparatus (300) for capturing a 360 degree panoramic photograph or sequence of photographs of a subject located at a stage portion (302) of an enclosure (100) thereof. The imaging apparatus (300) comprises a modular enclosure (100), and a motor assembly (200) coupled to a top portion of the enclosure (100). The motor assembly (200) includes an output shaft (202) adapted to rotate a support member (206) around a subject located at the stage portion (302). The support member (206) has a first arm (206-1) coupled with a fixture (210) adapted to mount one or more imaging devices and a second arm (206-2) coupled with a counterbalance member (212) configured to balance weight of the imaging devices while the support member (206) is rotated.

20 Claims, 9 Drawing Sheets

IMAGING APPARATUS

TECHNICAL FIELD

The present invention relates to imaging systems, and more specifically to an imaging apparatus capable of capturing a 360 degree panoramic photograph or sequence of photographs and videos of a subject and surrounding background.

BACKGROUND OF THE INVENTION

Background description includes information that may be useful in understanding the present invention. It is not an admission that any of the information provided herein is prior art or relevant to the presently claimed invention, or that any publication specifically or implicitly referenced is prior art.

In recent years, spherical imaging, commonly referred to as "Virtual reality", or "VR" photography, developed from still to moving images. Commercially available panoramic video capture devices, such as multiple camera arrays, typically capture only an extended hemisphere around an imaging device, such as a camera, leaving a blind spot where a support element, such as a pole supports the panoramic video capture device.

Conventionally, photo booths have been available since the 50's to make wallet sized pictures using wet chemistry. The pictures produced are very low quality. Among state-of-the-art photo booths there are various types of photo booths where there is a single camera that takes the photograph of a subject. However, such photo booths have a normal strip of photographs as a product, which only allows images to be taken from an established, fixed position. In addition, such photo booths are immobile in nature.

More recent apparatus have been developed to overcome deficiencies of conventional photo booths. Such commercially available photo booths are capable of taking a picture of a subject and superimposing a selected background on the resulting image (green screen). Such photo booths may also take an image of a subject, defocus the background and superimpose a selected image as background.

However, all such apparatuses are constructed and designed as a unitary permanent or semi-permanent structure placed usually in a high volume area. Moreover, quality of images and pictures obtained from these devices are not very high, compared to a professional studio lighting environment.

There is therefore a need to develop an extremely modular and portable imaging apparatus, affixed with 360 degree LED lighting, which is capable of addressing the above-mentioned deficiencies.

SUMMARY OF THE INVENTION

An aspect of the present invention relates to an imaging apparatus having a modular motor assembly designed to be top-mounted and easily removable from an enclosure having a metal truss and curved tension barrier structure. The metal truss and curved tension barrier structure of the enclosure improves portability of the imaging apparatus by allowing easy assembly or dis-assembly of the imaging apparatus.

The imaging apparatus includes a modular enclosure, and the motor assembly coupled to a top portion of the enclosure. The motor assembly includes an output shaft adapted to rotate a support member, through a clamping member, around a subject located at a stage portion of the enclosure. The support member has a first arm coupled with a fixture adapted to mount one or more imaging devices and a second arm coupled with a counter-balance member configured to balance weight of the one or more imaging devices while the support member is rotated. The clamping member is adapted to adjust length of the first arm of the support member.

The motor assembly also includes a collision detection system configured to stop rotation of the support member if a contact between the first arm of the support member and the subject is detected.

According to an embodiment of the present invention, the collision detection system may include at least one neodymium magnetic clutch to detect contact between the first arm of the support member and the subject.

According to an embodiment of the present invention, the motor assembly may include one or more pancake slip rings for transmission of electrical signals from the motor assembly to the one or more imaging devices.

According to an embodiment of the present invention, the fixture coupled to the first arm of the support member has a lighting portion configured to accommodate a plurality of lighting devices.

According to an embodiment of the present invention, length of the second arm of the support member is shorter than length of the first arm of the support member.

According to an embodiment of the present invention, the counter-balance member may include a plurality of disk weights.

According to an embodiment of the present invention, the motor assembly is selected from the group consisting of a planetary gear motor, a servo motor, a Brushless Direct Current (BLDC) electric motor electric and a stepper motor.

According to an embodiment of the present invention, the motor assembly may be coupled with a wireless transceiver to control rotation of the support member by a wireless device.

According to an embodiment of the present invention, the motor assembly may include a display unit to display information pertaining to speed of rotation of the support member.

According to an embodiment of the present invention, the enclosure may include a metal truss structure having an inflatable dome-like tent with a buttress-style aluminum pole assembly attached to an inflatable tent.

According to an embodiment of the present invention, the clamping member includes a ball-mount joint clamp to couple the support member with the output shaft of the motor assembly.

According to an embodiment of the present invention, the clamping member is configured to adjust movement of the first arm of the support member towards and away from the output shaft of the motor assembly.

According to an embodiment of the present invention, the fixture is adapted to mount an adjustable 3-axis camera mount.

According to an embodiment of the present invention, the one or more imaging devices are selected from the group consisting of cameras, tablets, lenses and mobile phones.

According to an embodiment of the present invention, the imaging apparatus may be completely self-powered by a standalone power source, such as, a Lithium battery Bank or a built-in lithium battery charging station.

According to an embodiment of the present invention, the enclosure includes a plurality of lighting portions for mounting lighting devices.

Another aspect of the present invention relates to a motor assembly for an imaging apparatus, which includes an output shaft adapted to rotate an arcuate support member, through a clamping member, around a subject located at a stage portion of the imaging apparatus. The support member has a first arm coupled with a fixture adapted to mount one or more imaging devices and a second arm coupled with a counter-balance member having a plurality of disk weights to balance weight of the one or more imaging devices while the support member is rotated. The clamping member is adapted to adjust length of the first arm of the support member.

The motor assembly also includes a collision detection system configured to stop rotation of the support member if a contact between the first arm of the support member and the subject is detected. Length of the second arm of the support member is shorter than length of the first arm of the support member.

According to an embodiment of the present invention, the motor assembly may be coupled with a wireless transceiver to control rotation of the support member by a wireless device.

According to an embodiment of the present invention, the imaging apparatus also employs a framed aluminum pipe-style curved enclosure structure with tension fabric covers to improve structure stability and portability of the imaging apparatus.

According to an embodiment of the present invention, the enclosure may have 8.5 ft high arch structure to allow mounting of high-visibility signage or stage lightings. The imaging device may further include a plurality of mount points adapted to mount peripherals, such as light-emitting diode (LED) lighting, and monitor displays for additional multi-media content. According to another embodiment of the present invention, the imaging apparatus may be provided with popular stage effects such as remote powered bubble and fog machines.

According to an embodiment of the present invention, components of the enclosure may be made up of metal alloys. In an implementation, the metal truss and curved tension barrier structure may employ aluminum triple-pole extrusion design to provide superior structural strength, and reduce weight of the enclosure for easy assembly/dis-assembly thereof. The enclosure may be dis-assembled in a very compact form-factor to enable easy transportation, handling and shipping.

According to an embodiment of the present invention, the enclosure may also include a plurality of securing members, such as bungee-ties, for coupling of adjacent poles of the metal truss and curved tension barrier structure.

BRIEF DESCRIPTION OF ACCOMPANYING DRAWINGS

The accompanying drawings are included to provide a further understanding of the present disclosure, and are incorporated in and constitute a part of this specification. The drawings illustrate exemplary embodiments of the present disclosure and, together with the description, serve to explain the principles of the present disclosure.

In the figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

DETAILED DESCRIPTION OF THE INVENTION

Figure 1A:
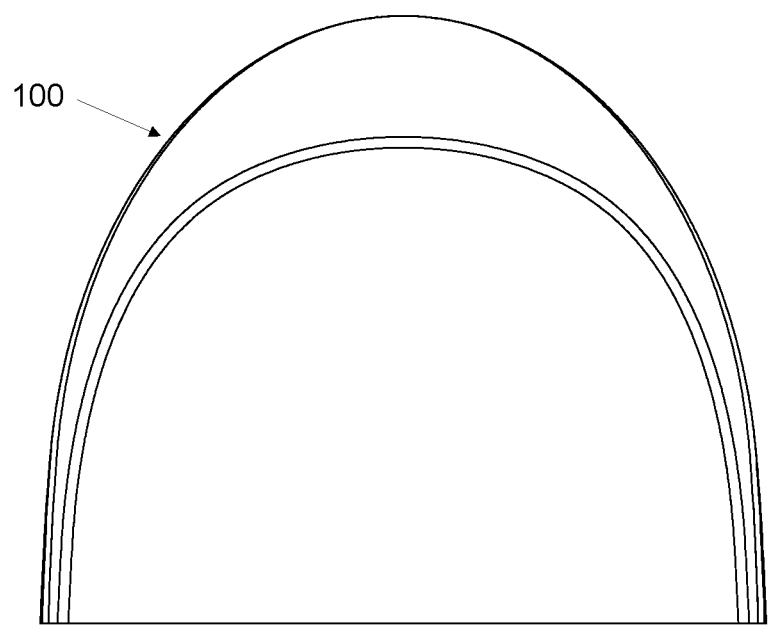
FIGS. 1A through 1H illustrate various exemplary representations of an enclosure of an imaging apparatus in accordance with embodiments of the present invention.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

If the specification states a component or feature "may", "can", "could", or "might" be included or have a characteristic, that particular component or feature is not required to be included or have the characteristic.

Exemplary embodiments will now be described more fully hereinafter with reference to the accompanying drawings, in which exemplary embodiments are shown. This disclosure may however, be embodied in many different forms and should not be construed as limited to the embodiments set forth herein. These embodiments are provided so that this disclosure will be thorough and complete and will fully convey the scope of the disclosure to those of ordinary skill in the art. Moreover, all statements herein reciting embodiments of the disclosure, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Various terms as used herein are shown below. To the extent a term used in a claim is not defined below, it should be given the broadest definition persons in the pertinent art have given that term as reflected in printed publications and issued patents at the time of filing.

In some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

The present invention relates to an imaging apparatus for capturing a 360 degree panoramic photograph or sequence of photographs and/or videos of a subject and surrounding background. The imaging apparatus employs components that are modular to improve portability of the imaging apparatus. The imaging apparatus employs a metal truss structure and a motor assembly designed to be top-mounted and easily removable from the metal truss structure. The metal truss structure improves portability of the imaging apparatus by allowing easy assembly or dis-assembly of the imaging apparatus.

Figure 1B:
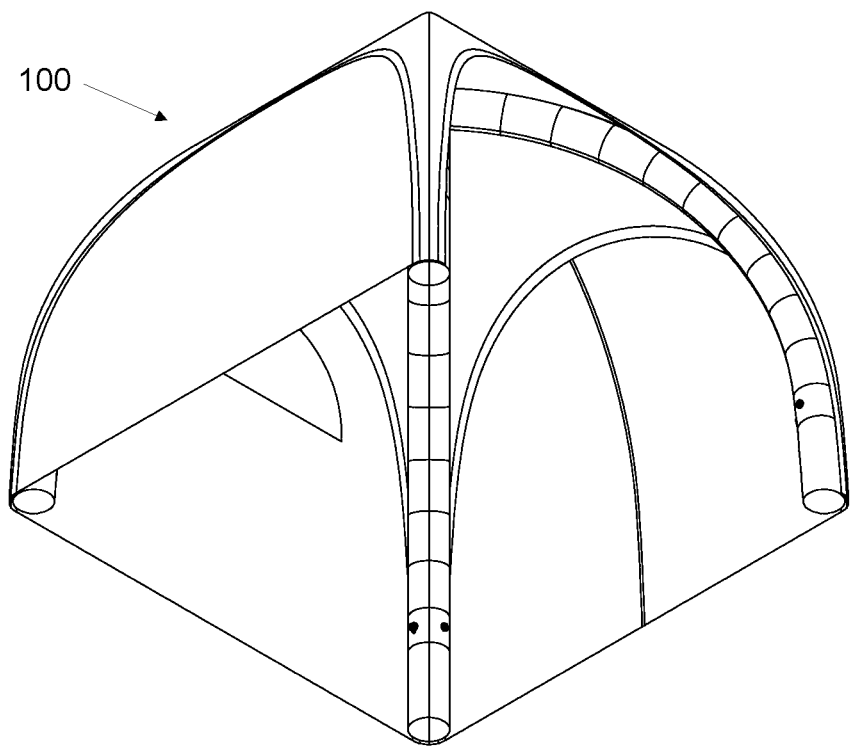
Figure 1C:
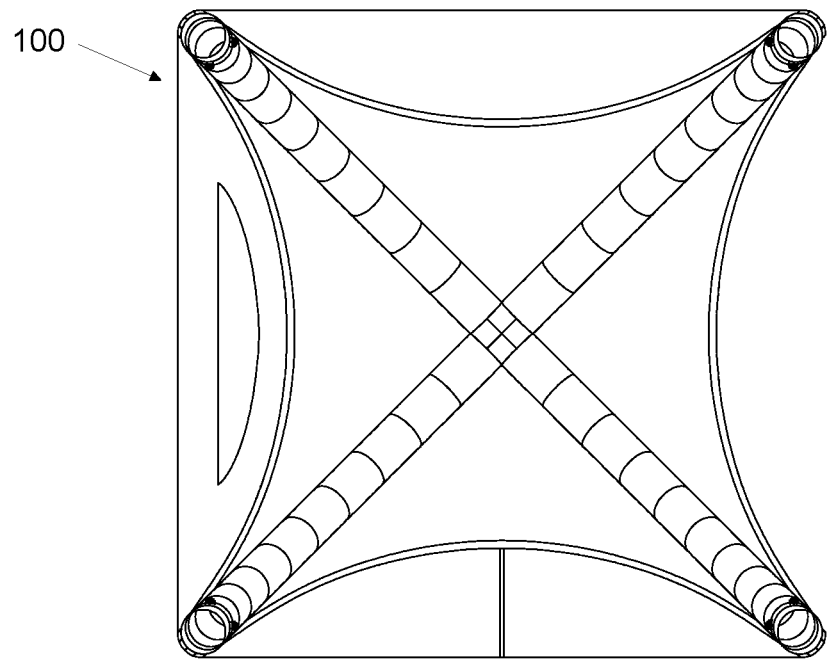
Figure 1D:
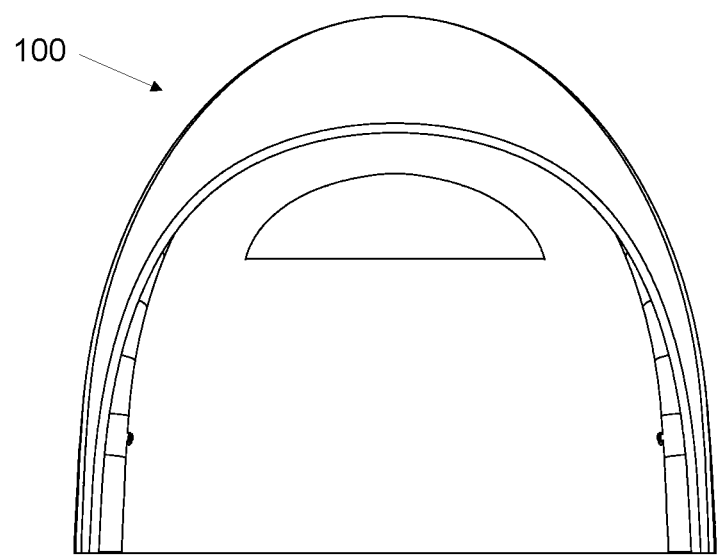
Figure 1E:
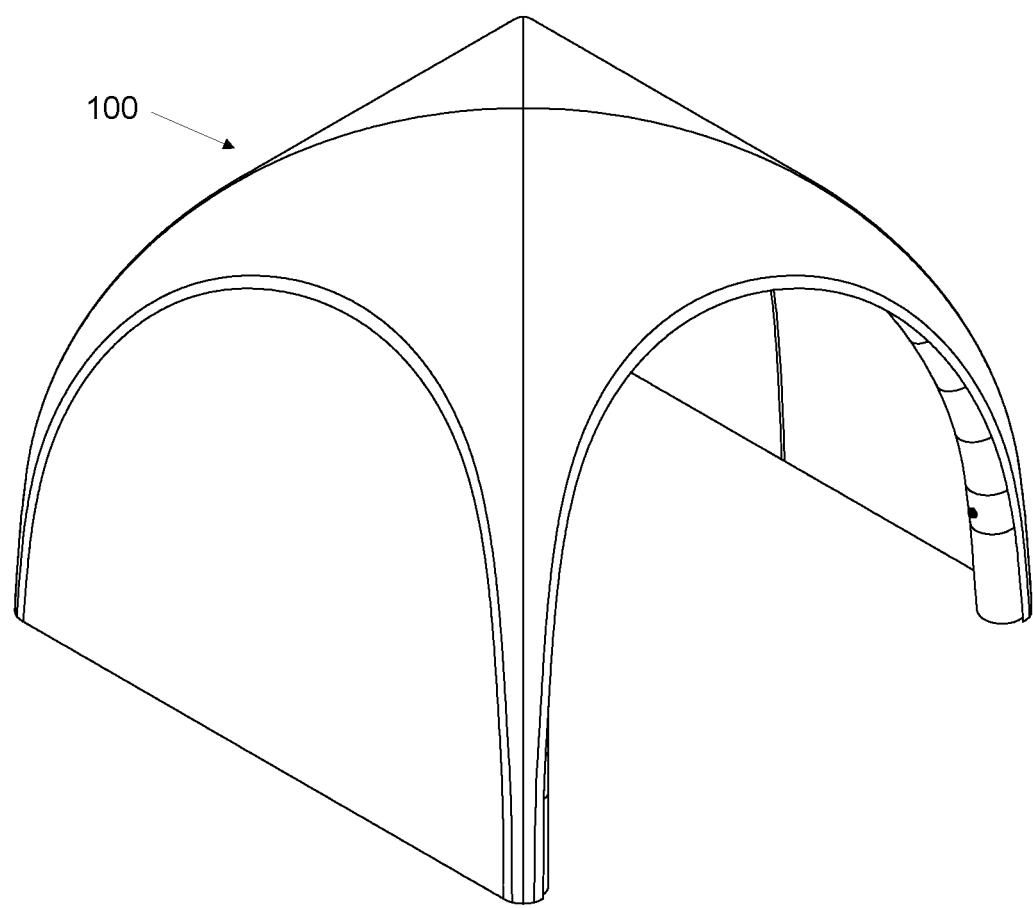
Figure 1F:
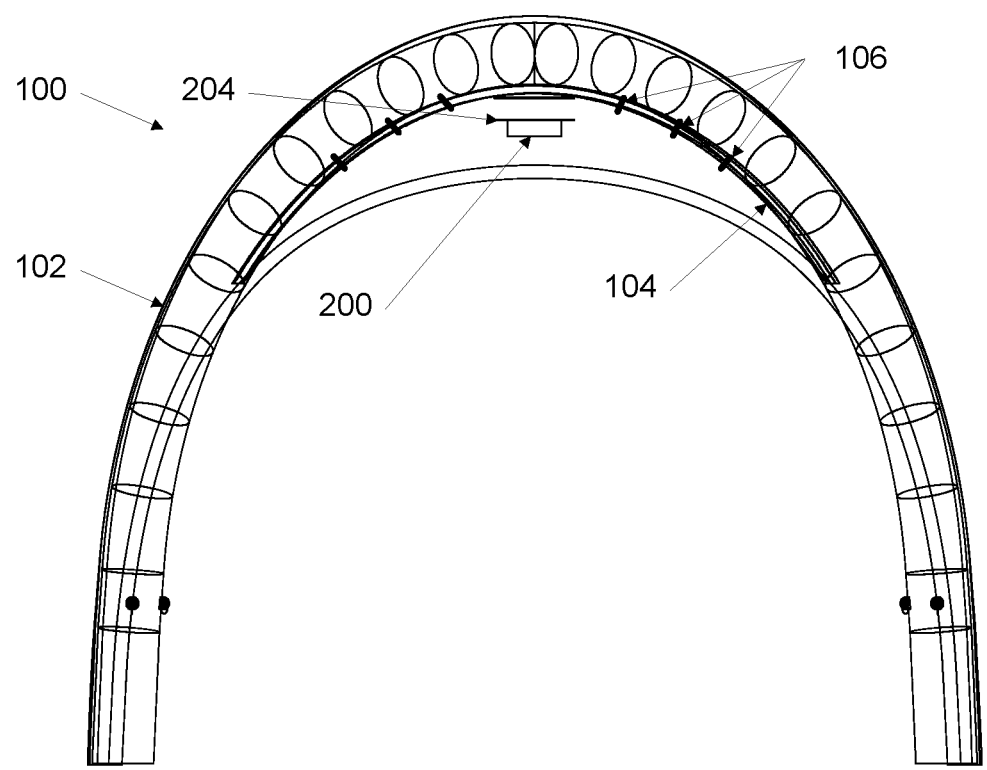
Figure 1G:
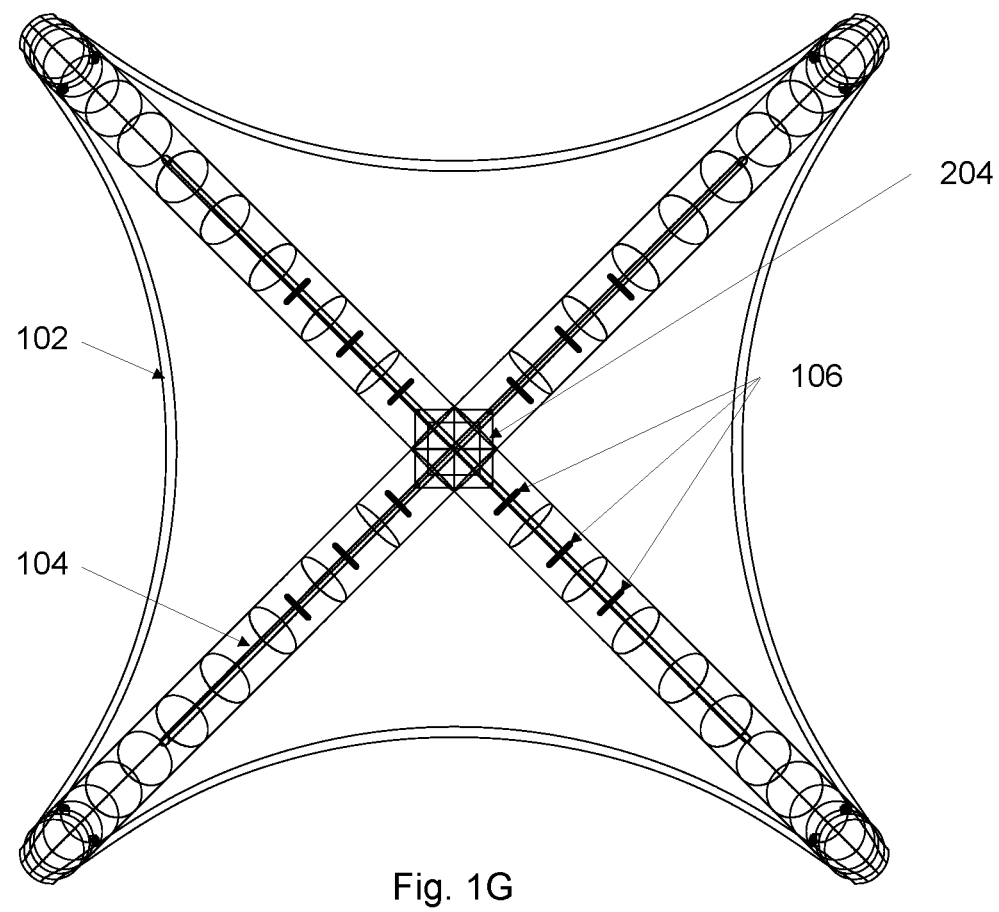
Figure 1H:
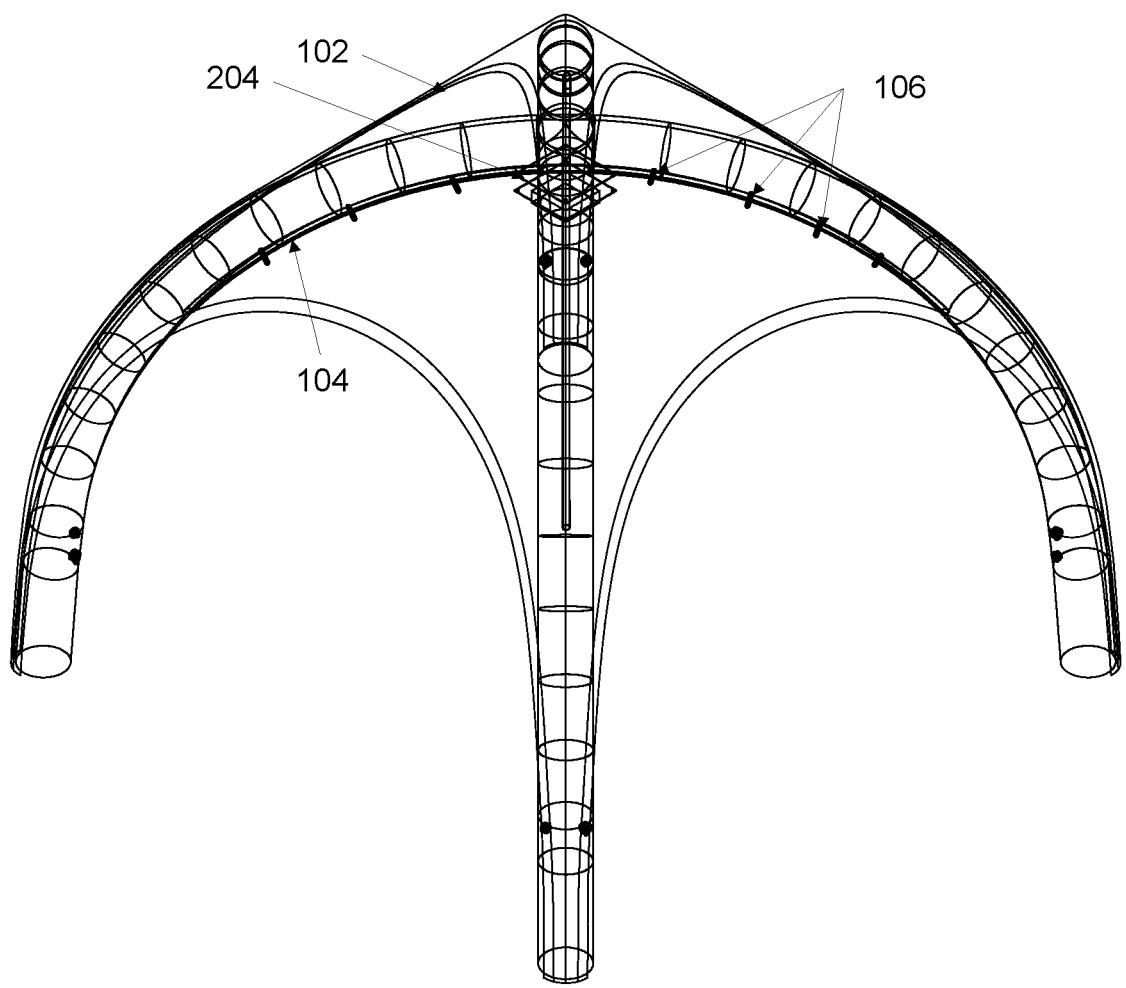

FIGS. 1A through 1H illustrate various exemplary representations of an enclosure (100) of the imaging apparatus. FIGS. 1B and 1C illustrate sectional views of a side portion and a top portion of the enclosure (100), respectively. FIGS. 1F and 1G illustrate exemplary wireframe representation showing a side view and a top view of the enclosure (100), respectively. FIGS. 1H illustrates exemplary wireframe representation showing an isometric view of the enclosure (100). The enclosure may have an inflatable dome-like tent (102), as shown in wireframe representation of the enclosure (100) in FIGS. 1F to Fig. H, including a plurality of sheets be made up of a flexible material, such as, cotton/canvas with polyvinyl chloride coating, polyester-cotton, polyester, nylon, and the likes. The dome-like tent (102) may employ fastening members, such as, Velcro or zippers, for coupling of the sheets to form the dome-like tent (102). The sheets of the tent (102) may employ customized tension fabric covers.

The enclosure (100) also includes a modular pole assembly (104) including a metal truss structure for supporting the tent (102), such that the enclosure (100) provides a wide stage portion for the subject to move around freely. The pole assembly (104) may have at least two metal poles, preferably four poles, disposed on a ground surface to support weight of the enclosure (100). The pole assembly (104) may also include a plurality of securing members, such as bungee-ties or the likes, for coupling of adjacent poles. According to an embodiment of the present invention, components of the pole assembly (104) may be made up of metal alloys.

The tent (102) may be coupled with or wrapped around the pole assembly (104) to form an arch shaped enclosure (100). According to an embodiment of the present invention, the arch shaped enclosure (100) may have a height of 8.5 ft to allow mounting of high-visibility signage or stage lightings.

The pole assembly (104) may be a buttress-style aluminum pole assembly attached to the inflatable tent (102). The metal truss structure of the pole assembly (104) may employ aluminum triple-pole extrusion design to provide superior structural strength, and reduce weight of the enclosure (100). The enclosure (100) may be assembled or dis-assembled in a very compact form-factor to enable easy transportation, handling and shipping. The dome-like tent (102) may include a plurality of end pockets (106) through which the metal poles of the pole assembly (104) pass, so as to form the truss structure for supporting the tent (102) and to allow the pole assembly (104) to support weight of the inflatable tent (102). The end pockets (106) may be provided with Velcro pole-straps or zipper attachments for coupling of the sheets of the tent (102) with the metal poles of the pole assembly (104).

According to an embodiment of the present invention, the enclosure (100) may include a plurality of lighting portions, mounted on individual poles of the pole assembly (104), for mounting lighting devices to facilitate capturing of the 360 degree panoramic photograph or sequence of photographs of the subject, while the subject is present in the stage portion of the enclosure (100). The enclosure (100) may also include a plurality of mount points provided on individual poles of the pole assembly (104), adapted to mount peripherals, such as LED lighting, and monitor displays for additional multimedia content. The mount points of the enclosure (100) may be adapted to accommodate popular stage effects such as remote powered bubble and fog machines.

Figure 2A:
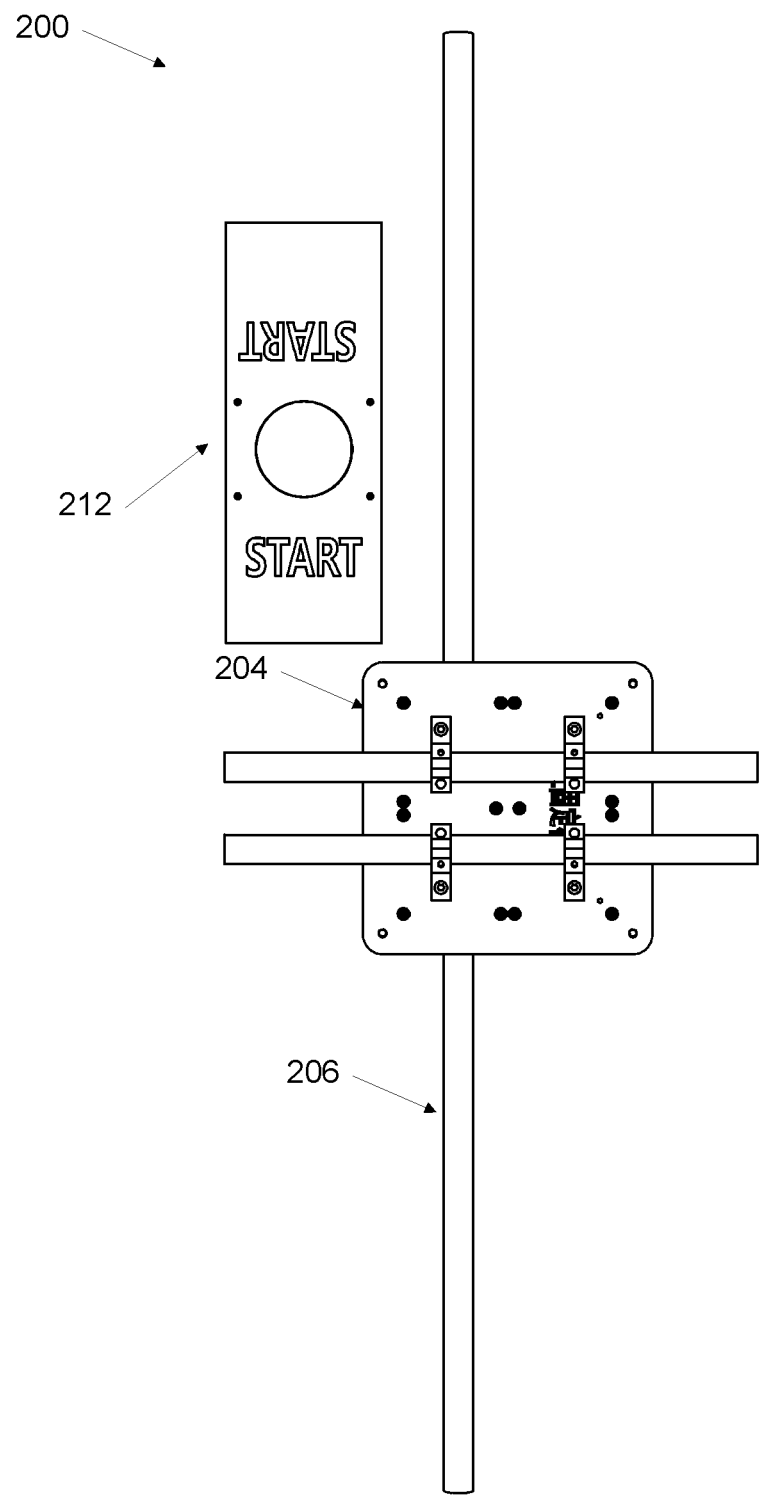
FIGS. 2A through 2F illustrate various exemplary representations of a motor assembly of the imaging apparatus in accordance with embodiments of the present invention.

According to an embodiment of the present invention, a top portion of the pole assembly (104) may be provided with a mounting plate (204), as clearly shown in FIG. 2A, to which the motor assembly (200), as clearly shown in FIG. 2A, may be fastened.

Figure 2B:
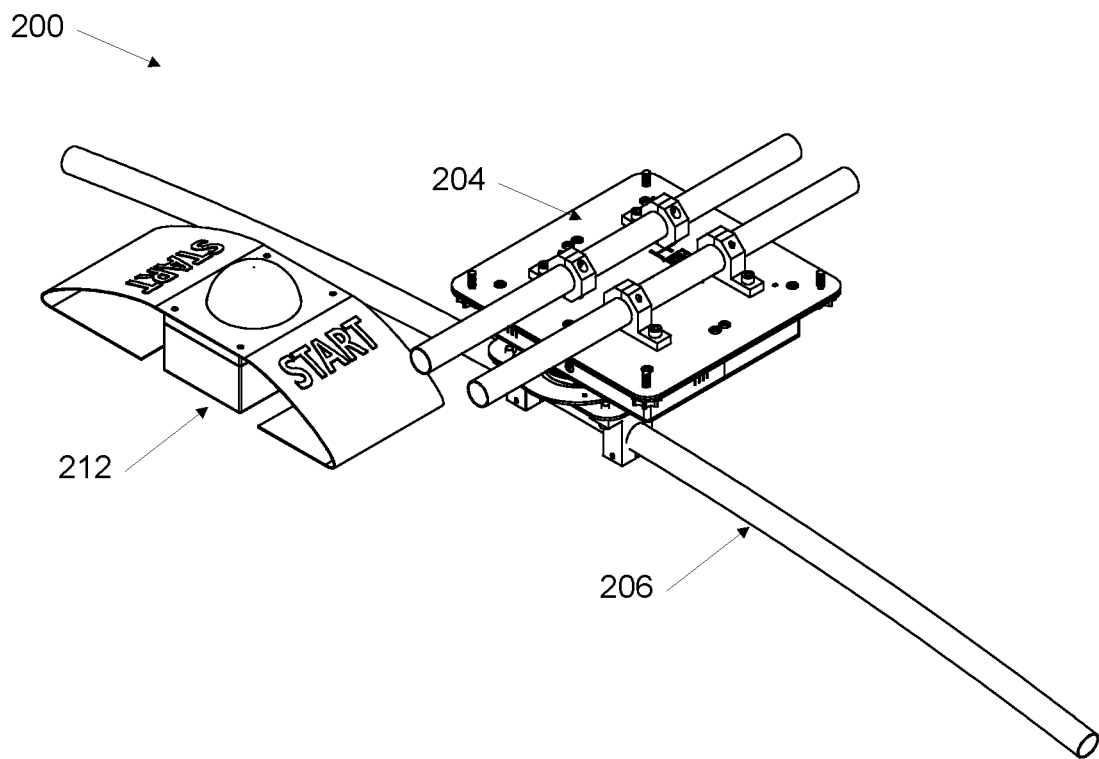
Figure 2C:
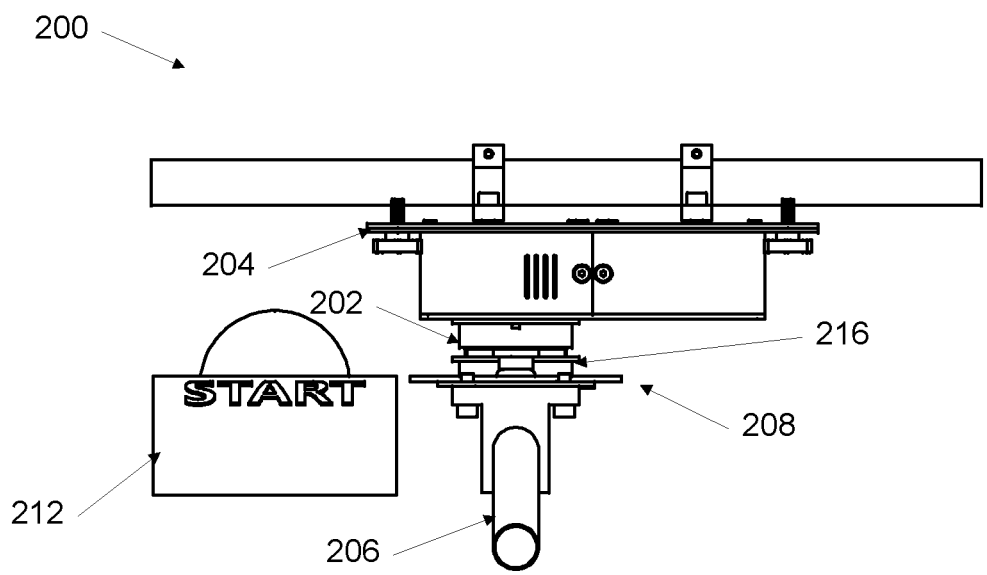
Figure 2D:
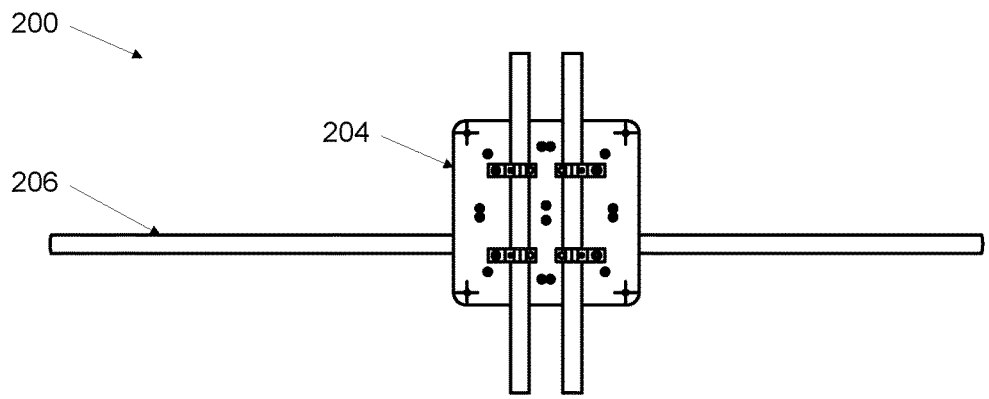
Figure 2E:
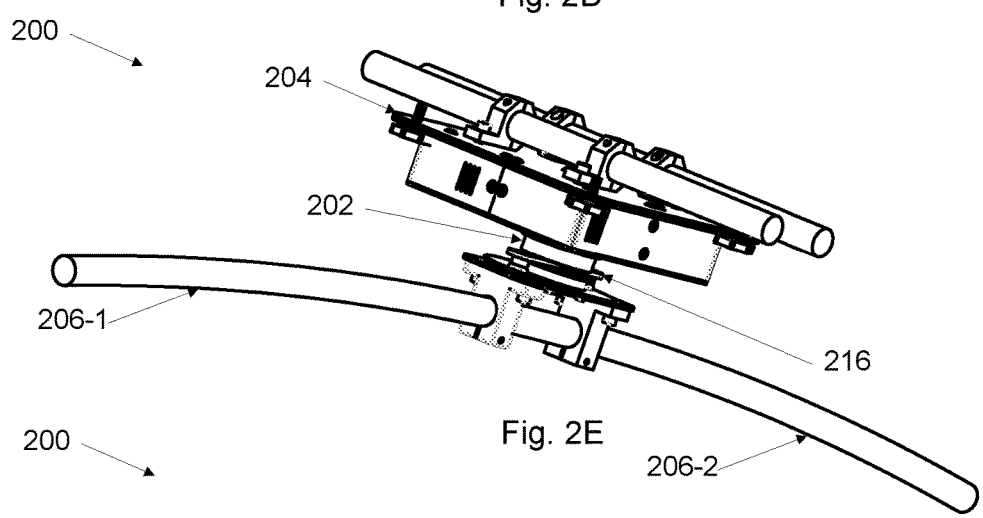
Figure 2F:
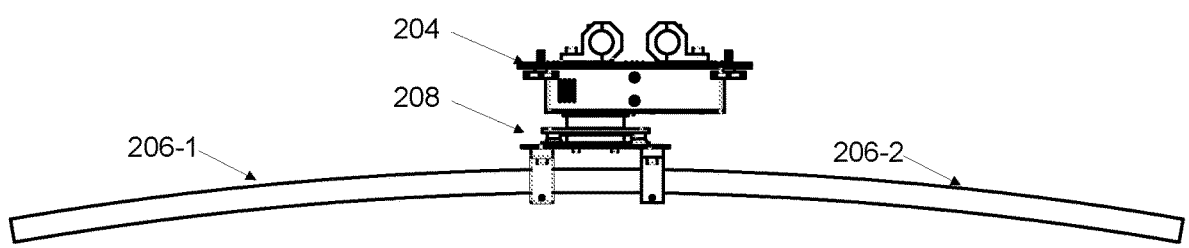

FIGS. 2A and 2D illustrate top view representations of the motor assembly (200) of the imaging apparatus. FIGS. 2B and 2E illustrate isometric representations of the motor assembly (200), respectively. FIGS. 2C and 2F illustrate a side view and a front view representations of the motor assembly (200), respectively. The motor assembly (200) may be coupled to a top portion of the enclosure (100), as clearly shown in FIG. 3, such that an output shaft (202) of the motor assembly (200), as clearly shown in FIGS. 2C and 2E, is present in an inverted position to face the stage portion (302) of the enclosure (100), as clearly shown in FIG. 3. According to an embodiment of the present invention, the motor assembly (200) is modular, in that it may be moved and retrofitted/attached with other structures of the enclosure (100).

The motor assembly (200) may be fastened to the mounting plate (204) of the enclosure (100), through a plurality of fasteners, such as nut and bolt, screws, and the likes. Standoff bolts may be provided on the mounting plate (204) for fitment of the motor assembly (200). The output shaft (202) of the motor assembly (200) is operatively coupled with a support member (206), through a clamping member (208), to rotate the support member (206) around the subject located at the stage portion (302) of the enclosure (100).

Figure 3:
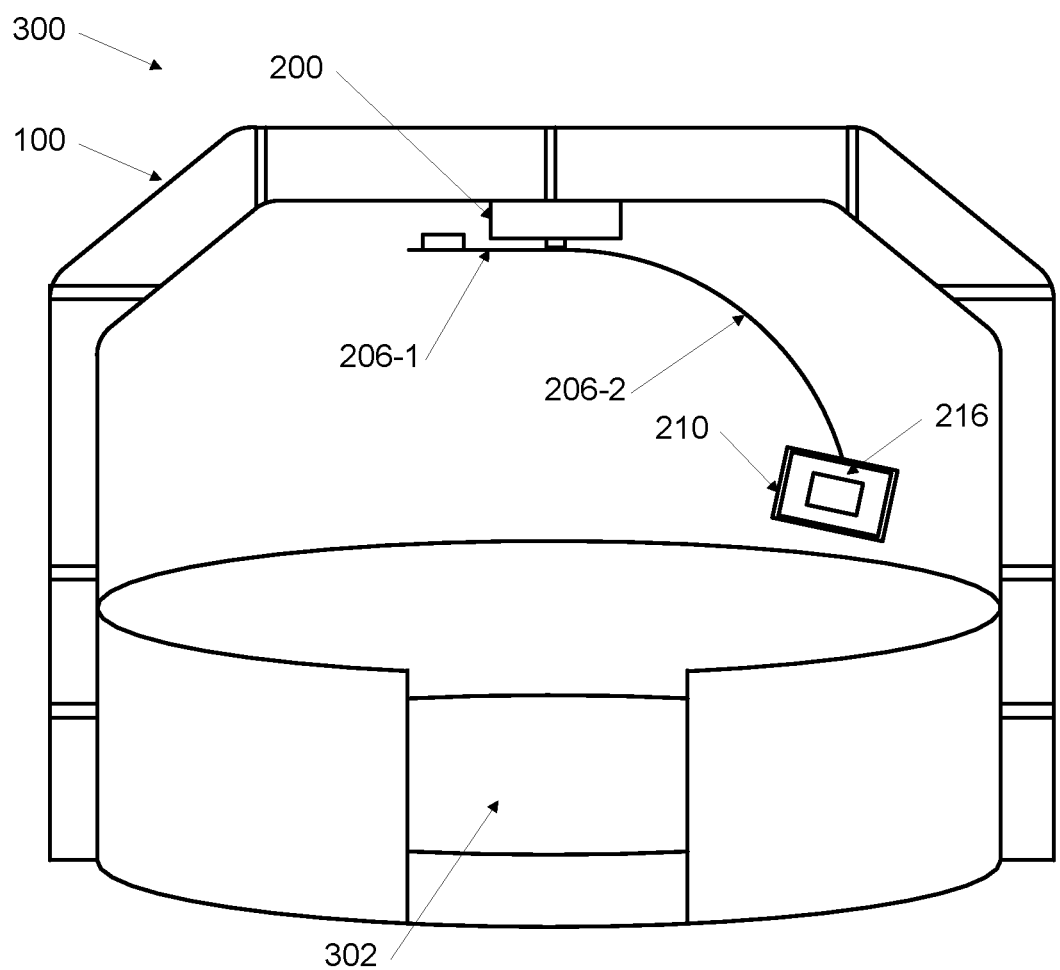
FIG. 3 illustrates an exemplary representation of the imaging apparatus in accordance with embodiments of the present invention.

The support member (206) has a first arm (206-1) coupled with a fixture (210), as clearly shown in FIG. 3, adapted to mount one or more imaging devices and a second arm (206-2) coupled with a counter-balance member (212) configured to balance weight of the one or more imaging devices while the support member (206) is rotated around the subject present in the stage portion (302) of the enclosure (100). The fixture (210) is mounted to the first arm (206-1) by a ball-mount joint clamp. The clamping member (208), as shown in FIG. 2F, may be adapted to adjust length of the first arm (206-1) of the support member (206). The clamping member (208) is used to couple a bottom plate of the motor assembly (200) with the support arm.

According to an embodiment of the present invention, the support member (206) may be a single pole structure having at least one pole operatively coupled with the output shaft (202) of the motor assembly (200), through the clamping member (208). The first arm (206-1) and the second arm (206-2) may correspond to a first end and a second end of the single pole structure of the support member (206), respectively. The clamping member (208) may include a ball-mount joint clamp to couple the support member (206) with the output shaft (202) of the motor assembly (200). The clamping member (208) may be configured to adjust movement of the first arm (206-1) of the support member (206) towards and away from the output shaft (202) of the motor assembly (200).

According to an embodiment of the present invention, length of the second arm (206-2) of the support member (206) is shorter than length of the first arm (206-1) of the support member (206). In an implementation, length of the first arm (206-1) extending from a vertical axis corresponding to the output shaft (202) is 32 inches and length of the second arm (206-2) extending from a vertical axis corresponding to the output shaft (202) is 21 inches. Since the first arm (206-1) is subjected to a tensile load due to weight of the fixture (210) mounting the one or more imaging devices, the first arm (206-1) has an arcuate profile.

According to an embodiment of the present invention, the counter-balance member (212) may include a plurality of disk weights of different or same weights, to balance the weight of the imaging device mounted on the fixture (210). The counter-balance member (212) may also include a casing to accommodate the disk weights, and facilitate easy fitment or removal of the disk weights. The casing of the counter-balance member (212) may be attached to the second arm (206-2) with the help of a set of threaded inserts.

Referring now to FIG. 3, where an exemplary representation of the imaging apparatus (300) is shown. According to an embodiment of the present invention, when the output shaft (202) of the motor assembly (200) rotates the support member (206), the fixture (210) mounting the one or more imaging devices is rotated around the subject located at the stage portion (302) of the enclosure (100), while the counter-balance member (212) coupled with the second arm (206-2) having a length shorter than the first arm (206-1) balances the weight of the one or more imaging devices. The subject may include one or more users.

According to an embodiment of the present invention, the one or more imaging devices may be selected from the group consisting of cameras, tablets, lenses and mobile phones. According to another embodiment of the present invention, the fixture (210) may further be adapted to mount an adjustable 3-axis camera mount for mounting of cameras or lenses.

According to an embodiment of the present invention, the motor assembly (200) may be selected from the group consisting of a planetary gear motor, a servo motor, a Brushless Direct Current (BLDC) electric motor electric and a stepper motor. The motor assembly (200) may employ a motor with customized commutator and brush arrangement to improve high current and high voltage characteristics thereof.

The motor assembly (200) includes a collision detection system (214), as shown in FIGS. 2C and 2E, configured to stop rotation of the support member (206) if a contact between the first arm (206-1) of the support member (206) and the subject is detected. The collision detection system (214) may include at least one neodymium magnetic clutch to detect contact between the first arm (206-1) of the support member (206) and the subject. The neodymium magnetic clutch has at least two magnet plates having pre-defined magnetic properties. The magnet plates may be neodymium plates.

When the magnet plates are in contact with each other, the neodymium magnetic clutch allows the output shaft (202) of the motor assembly (200) to rotate the first arm (206-1) of the support member (206). Further, when there is a contact or collision between the subject and the fixture (210) or the first arm (206-1), the magnet plates of the neodymium magnetic clutch disengage from each other, to halt/stop rotation of the first arm (206-1) of the support member (206) around the subject located at the stage portion (302) of the enclosure (100).

According to an embodiment of the present invention, the fixture (210) coupled to the first arm (206-1) of the support member (206) may have a lighting portion (216) configured to accommodate a plurality of lighting devices, for illuminating the subject located at the stage portion (302) of the enclosure (100), while the first arm (206-1) is rotating around the subject. The motor assembly (200) may also include one or more pancake slip rings for transmission of electrical signals from the motor assembly (200) to the one or more imaging devices mounted to the fixture (210).

According to an embodiment of the present invention, the imaging apparatus (300) may be completely self-powered by a standalone power source, such as, a Lithium battery Bank or a built-in lithium battery charging station. The standalone power source of the imaging apparatus (300) may power the motor assembly (200) to enable rotation of the output shaft (202). In an implementation, an EnginStar 300 Watt Portable Power Station with AC outlet may be used as the standalone power source. The one or more pancake slip rings of the motor assembly (200) may allow transmission of electrical signals from the output shaft (202) to the imaging devices mounted to the fixture (210), to provide a power source to the imaging devices. A suitable connector, such as, a Universal Serial Bus (USB) connector, may be used to connect the slip rings to the imaging devices. The slip rings may also act as a spacer to set a clearance of approximately 0.05 to 0.20 inches between a bottom plate of the motor assembly (200) and a locking groove located on the output shaft (202). The slip ring may include a screw hole corresponding to the locking groove of the output shaft (202). The slip ring may be fitted with the output shaft (202) with the help of extended-tip set screws.

According to an embodiment of the present invention, the motor assembly (200) may be coupled with a wireless transceiver to control rotation of the support member (206) by a wireless device, such as, a key fob, a remote, a computing device, and the like, from a remote location. The wireless device may transmit signals to the motor assembly (200), to allow remote control of rotation of the output shaft (202) of the motor assembly (200). The wireless transceiver may also be connected with the standalone power source of the imaging apparatus (300), to selectively control actuation of different components of the imaging apparatus (300).

In an implementation, the wireless transceiver may be operatively coupled with a foot pedal switch configured to selectively control activation of a set of lighting devices of the imaging apparatus (300) as well as control of rotation of the output shaft (202) of the motor assembly (200).

According to an embodiment of the present invention, the motor assembly (200) may include a display unit to display information pertaining to speed of rotation of the support member (206). The display unit may also be configured to display information pertaining to number of rotation of the output shaft (202) of the motor assembly (200). The display unit may be protected from dust and debris by a plastic shield. The display unit may be connected with tachometer device or a set of infrared (IR) sensors to measure or determine rotation speed of the output shaft (202). In an implementation, the display unit may be an LED display unit.

While embodiments of the present disclosure have been illustrated and described, it will be clear that the disclosure is not limited to these embodiments only. Numerous modifications, changes, variations, substitutions, and equivalents will be apparent to those skilled in the art, without departing from the spirit and scope of the disclosure, as described in the claims.

We claim:

1. An imaging apparatus (300), comprising:
   a modular enclosure (100); and
   a motor assembly (200) coupled to a top portion of the enclosure (100), the motor assembly (200) comprising:
   an output shaft (202) adapted to rotate a support member (206), through a clamping member (208), around a subject located at a stage portion (302) of the enclosure (100), the support member (206) having a first arm (206-1) coupled with a fixture (210)

adapted to mount one or more imaging devices and a second arm (206-2) coupled with a counter-balance member (212) configured to balance weight of the one or more imaging devices while the support member (206) is rotated, wherein the clamping member (208) is adapted to adjust length of the first arm (206-1) of the support member (206); and a collision detection system (214) configured to stop rotation of the support member (206) if a contact between the first arm (206-1) of the support member (206) and the subject is detected.

2. The imaging apparatus (300) as claimed in claim 1, wherein the collision detection system (214) comprises at least one magnetic clutch to detect contact between the first arm (206-1) of the support member (206) and the subject.

3. The imaging apparatus (300) as claimed in claim 1, wherein the motor assembly (200) includes one or more pancake slip rings for transmission of electrical signals from the motor assembly (200) to the one or more imaging devices.

4. The imaging apparatus (300) as claimed in claim 1, wherein the fixture (210) coupled to the first arm (206-1) of the support member (206) has a lighting portion configured to accommodate a plurality of lighting devices.

5. The imaging apparatus (300) as claimed in claim 1, wherein length of the second arm (206-2) of the support member (206) is shorter than length of the first arm (206-1) of the support member (206).

6. The imaging apparatus (300) as claimed in claim 1, wherein the counter-balance member (212) comprises a plurality of disk weights.

7. The imaging apparatus (300) as claimed in claim 1, wherein the motor assembly (200) is selected from the group consisting of a planetary gear motor, a servo motor, a Brushless Direct Current (BLDC) electric motor electric and a stepper motor.

8. The imaging apparatus (300) as claimed in claim 1, wherein the motor assembly (200) is coupled with a wireless transceiver to control rotation of the support member (206) by a wireless device.

9. The imaging apparatus (300) as claimed in claim 1, wherein the motor assembly (200) comprises a display unit to display information pertaining to speed of rotation of the support member (206).

10. The imaging apparatus (300) as claimed in claim 1, wherein the enclosure (100) comprises a metal truss structure having an inflatable dome-like tent with a buttress-style aluminum pole assembly attached to an inflatable tent.

11. The imaging apparatus (300) as claimed in claim 1, wherein the clamping member (208) comprises a ball-mount joint clamp to couple the support member (206) with the output shaft (202) of the motor assembly (200).

12. The imaging apparatus (300) as claimed in claim 1, wherein the clamping member (208) is configured to adjust movement of the first arm (206-1) of the support member (206) towards and away from the output shaft (202) of the motor assembly (200).

13. The imaging apparatus (300) as claimed in claim 1, wherein the fixture (210) is adapted to mount an adjustable 3-axis camera mount.

14. The imaging apparatus (300) as claimed in claim 1, wherein the one or more imaging devices are selected from the group consisting of cameras, tablets, lenses and mobile phones.

15. The imaging apparatus (300) as claimed in claim 1, wherein the imaging apparatus (300) is powered by a built-in lithium battery charging station.

16. The imaging apparatus (300) as claimed in claim 1, wherein the enclosure (100) comprises a plurality of lighting portions for mounting lighting devices.

17. A motor assembly (200) for an imaging apparatus (300), comprising:

an output shaft (202) adapted to rotate an arcuate support member (206), through a clamping member (208), around a subject located at a stage portion (302) of the imaging apparatus (300), the support member (206) having a first arm (206-1) coupled with a fixture (210) adapted to mount one or more imaging devices and a second arm (206-2) coupled with a counter-balance member (212) comprising a plurality of disk weights to balance weight of the one or more imaging devices while the support member (206) is rotated, wherein the clamping member (208) is adapted to adjust length of the first arm (206-1) of the support member (206); and a collision detection system (214) configured to stop rotation of the support member (206) if a contact between the first arm (206-1) of the support member (206) and the subject is detected, wherein length of the second arm (206-2) of the support member (206) is shorter than length of the first arm (206-1) of the support member (206).

18. The motor assembly (200) as claimed in claim 17, wherein the collision detection system (214) comprises at least one magnetic clutch to detect contact between the first arm (206-1) of the support member (206) and the subject.

19. The motor assembly (200) as claimed in claim 17, wherein the motor assembly (200) includes one or more pancake slip rings for transmission of electrical signals from the motor assembly (200) to the one or more imaging devices.

20. The motor assembly (200) as claimed in claim 17, wherein the motor assembly (200) is coupled with a wireless transceiver to control rotation of the support member (206) by a wireless device.

* * * * *